June 6, 1939. T. TURCHENKO 2,161,113
DEVICE FOR TREATING HONEY
Filed April 3, 1937
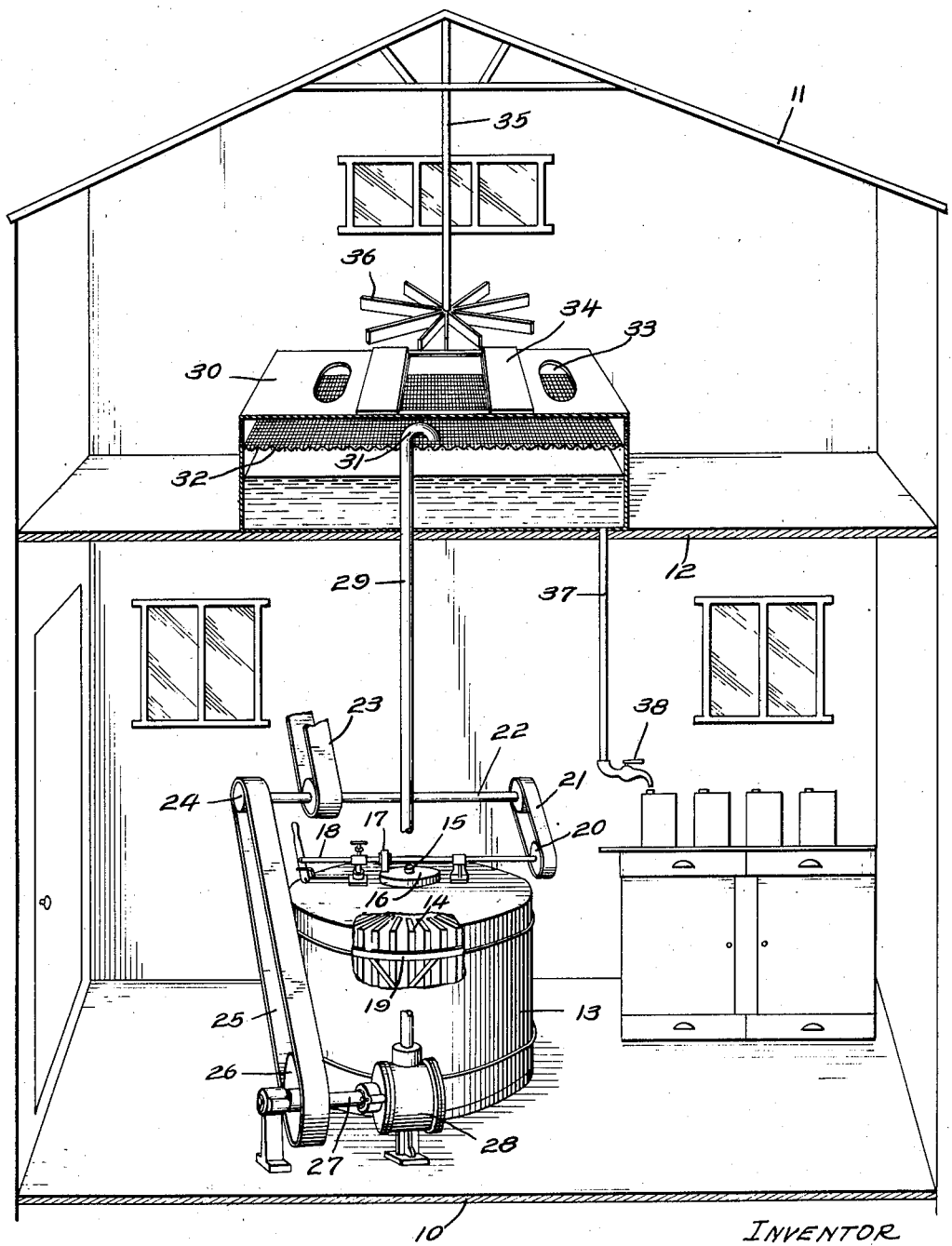
INVENTOR
THEODORE TURCHENKO
BY
ATTORNEY Patented June 6, 1939

2,161,113

UNITED STATES PATENT OFFICE 2,161,113

DEVICE FOR TREATING HONEY

Theodore Turchenko, Lisle, Ill.

Application April 3, 1937, Serial No. 134,817

1 Claim. (Cl. 159—16)

The present invention relates to honey treating means and has for its principal object the provision of a device in combination with a honey extractor such as centrifugal machine, whereby honey may be passed into a container in which the same would be acted upon by means of air for taking out from honey the excess amount of water and volatile oleaginous substances and with them odors which are not typical of honey.

A still further object of the present invention is the provision of a device in combination with a honey extracting machine, whereby the honey may be passed into a container, wherein means may be provided to take away from the honey an excess amount of water, and in which container the heavier honey settling at the bottom of the container may be withdrawn therefrom as a finished product.

A still further object of the present invention is the provision of a device in combination with a honey extracting machine, including a container wherein the honey may be passed from the extracting machine and wherein the same may undergo a series of steps of purification process for removal from the honey of foreign matter including particles of wax, in addition to the removal of excess amount of water and volatile oleaginous substances and with them odors not characteristic of honey.

A still further object of the present invention is the provision of a device wherein the honey, as the same undergoes the purification process, its heaviest and most wholesome portion may precipitate and wherein the precipitated honey may be removed without intermixing the same with the portion of honey which has not as yet completely undergone the treatment.

A still further object of the present invention is the provision of a method of treating honey whereby excess amount of water as well as volatile oleaginous substances may be removed therefrom without in any way detracting from the quality of honey, but on the contrary, adding thereto, and whereby the treated honey may precipitate and be removed from the honey which undergoes the treatment, without in any way intermixing the portion of honey treated with that not completely treated.

With the above general objects in view and others that will appear as the invention is better understood, the same consists in the novel construction, combination and arrangement of parts hereinafter more fully described, illustrated in the accompanying drawing and pointed out in the appended claim.

In the drawing forming a part of this application the figure represents an elevational view of the device partly in section.

Referring to the present drawing there is shown a structure including floor 10, ceiling 11 and shelf 12. Positioned upon floor 10 is a centrifugal extracting machine which includes a receptacle 13 wherein honey combs 14 may be radially positioned. Keyed to the upper end of axial shaft 15 above the lid of the receptacle 13 is wheel 16 which meshes with pinion 17 which is set upon shaft 18. Framework 19, within which combs are rigidly held, is affixed to said shaft 15 and is adapted for rotary movement therewith. One end of said shaft 18 carries pulley 20 which is connected by means of belt 21 with shaft 22, to which power is imparted by means of belt 23 which in turn connects with a motor, not shown, or with any other motive source.

The opposite end of shaft 22 carries pulley 24 which connects by means of belt 25 with pulley 26 which is set upon shaft 27. The latter shaft operates pump which is set within pump casing 28. The pump casing connects by means of pipe, not shown, with the lower end of receptacle 13 whereby honey may be drawn from said receptacle 13 into pump casing 28 and therefrom forced into pipe 29 which also connects with pump casing 28 and leads in an upward direction above the honey extractor hereinabove described.

It is to be understood that I do not wish to be limited to any particular construction of the honey extractor, and the honey extractor shown on the drawing is merely for illustration purpose.

Said pipe 29 passes through shelf 12 and through the bottom wall of receptacle 30 and has its upper end curved as at 31, its open end overhanging wire mesh 32 positioned within receptacle 30 and at the upper portion thereof. Honey forced by the pump into pipe 29 will be caused to flow therefrom upon said mesh 32 and seep through it and settle at the bottom of receptacle 30 while any impurities such as beeswax or pollen will remain upon said mesh 32.

It is observed that it is preferred to position receptacle 30 at the top of the structure illustrated on the drawing for the reason that the air near the roof is warmer. The warmer temperature acting upon honey causes it to more readily flow through mesh 32 and at the same time adds to it a higher degree of fluency, and when in that condition honey is more readily adapted for the action of the method herein described.

The top wall of said receptacle 30 is provided with one or more openings 33 including central opening of larger dimensions which may be closed by means of doors 34. If preferred said doors 34 may be screened and other openings may likewise be screened preventing flies or bees to enter said receptacle 30. Similar openings may be provided at the sides of receptacle 30 and may be likewise screened.

Above said receptacle 30, and suspended from ceiling 11 upon shaft 35 is fan 36, which, when rotated, will force air into said receptacle 30 through openings 33. The air forced by said fan into said receptacle 30 will act upon honey on the mesh 32 as well as at the bottom of said receptacle 30 for removing therefrom the excess amount of water as well as oleaginous volatile substances. The air would pass from said receptacle 30 through side openings in the receptacle which may be provided.

The honey as treated by device and method hereinabove described will settle at the bottom of receptacle 30 and due to the principles of gravity the heaviest layers thereof will settle at the very bottom of receptacle 30 from which the same may be removed through pipe 37 which is provided with faucet 38 at its lower end. The upper end of said pipe 37 connects with the bottom wall of receptacle 30 and passes through shelf 12.

While there is described herein a preferred embodiment of the present invention, it is nevertheless to be understood that minor changes may be made therein without departing from the spirit and scope of the invention as claimed.

What I claim as new is:

A honey treating apparatus comprising, in combination, an enclosure, a honey extractor arranged in the lower portion of said enclosure, a honey dehydrating and treating device arranged in the upper portion of said enclosure, a pipe connecting said honey dehydrating and treating device with said extractor, means for forcing the honey through said pipe from said extractor into said honey dehydrating and treating device, means for blowing the warmer air from the upper portion of said enclosure upon the honey as it is discharged into said honey dehydrating and treating device, and a valved outlet pipe depending from said honey dehydrating and treating device into the lower portion of said enclosure for dispensing the treated honey from said device.

THEODORE TURCHENKO.